(12) United States Patent
Nemoto et al.

(10) Patent No.: US 6,284,073 B1
(45) Date of Patent: Sep. 4, 2001

(54) CORE SLIDER MOUNT APPARATUS AND CORE SLIDER MOUNT METHOD

(75) Inventors: Naoki Nemoto; Masami Takahashi; Mitsuo Iwatate; Yoshibumi Asano; Nobuatsu Takami, all of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/209,335

(22) Filed: Dec. 11, 1998

(30) Foreign Application Priority Data

Dec. 11, 1997 (JP) .................................................. 9-341716
Sep. 1, 1998 (JP) .................................................. 10-247252

(51) Int. Cl.[7] .............................. B32B 31/28; G11B 5/127
(52) U.S. Cl. .................... 156/64; 156/275.3; 156/275.7; 156/290; 156/378; 29/603.06; 29/407.1; 29/464; 29/740; 360/104
(58) Field of Search ................................... 156/64, 275.3, 156/275.7, 290, 378; 29/603.06, 407.1, 464, 739, 740; 360/103, 104

(56) References Cited

U.S. PATENT DOCUMENTS 4,866,836  *  9/1989  Von Brandt et al. .................. 156/64
5,951,807  *  9/1999  Asano et al. ....................... 156/273.5

* cited by examiner

Primary Examiner—Michael W. Ball
Assistant Examiner—Michael A. Tolin
(74) Attorney, Agent, or Firm—Adams & Wilks

(57) ABSTRACT

A core slider mount apparatus and method wherein: a core slider picked up from a core slider container is positioned while clamped in X- and Y-axis directions by first positioning catches of a core slider positioner and second positioning catches of a core mount chuck; a positioning error between an adhering portion of a work and the core slider is corrected based on position information of the work set on a work table; and the core slider is thereafter mounted on the adhering portion of the work.

16 Claims, 11 Drawing Sheets

CORE SLIDER MOUNT APPARATUS AND CORE SLIDER MOUNT METHOD

BACKGROUND OF THE INVENTION

1. Field of the Invention

The present invention relates to a core slider mounting apparatus and to a core slider mounting method for mounting a core slider onto a work piece such as a suspension (hereinafter referred to as a "gimbles") which constitutes a head of a hard disk drive.

2. Description of the Related Art

A robot mounter is a conventionally known apparatus for mounting a core slider of a hard disk drive onto gimbals. The robot mounter fixes the gimbals, which a work, and which have an adhering portion, to a jig disk, and after a dispenser applies an adhesive to the adhering portion of the gimbals, the robot mounter causes chucks on a robot head to vacuum attach and move a core slider from a core slider container.

The core slider is first mounted on a positioning unit to make positioning adjustments, and thereafter vacuum attached by the chucks on the robot head again, and then moved to the adhering portion of the gimbals to which the adhesive has been completely applied, and brought into contact with the adhering portion as vacuum sucked. Then, a spot radiating section radiates UV rays to tentatively cure the adhesive on the adhering portion of the gimbals. Such a robot mounter is of a space-saving cell type.

The that described robot mounter such as above is a semi-automated machine in the sense that a cell-type machine and operator work are performed in cooperation. That is, the operation of fixing the gimbals to the jig disk is performed by an operator through a rotary table for safety purposes, and this face-to-face operation is a completely manual-based operation. Thus, the operation with the robot mounter does involve the presence of an operator inside the clean room Further, the operation of fixing the gimbals to the jig disk, which is a manually performed operation, requires a certain degree of skill to achieve a desired fixing accuracy.

Further, the operation of fixing the gimbals to the jig disk, which is a manually performed operaion, requires a certain degree of skill to achieve a desire fixing accuracy.

Still further, a predetermined number of steps are involved to maintain the jig disk and the like since their required accuracies are on the order of microns.

Still further, although simple in its design, the robot mounter is not well suited for mass production.

Still further, although the respective processing steps are basically performed continuously, the curing step has to be performed on a separate unit. Thus, there is a limit in improving the cycle time.

SUMMARY OF THE INVENTION

The present invention has been made in view of the aforementioned problems. The object of the present invention is therefore to provide a core slider mounting apparatus and a core slider mount method which can mounting a core slider with high accuracy independently of variations in the manufacture of gimbals and jig disks.

To achieve the above object, a first aspect of the present invention provides a core slider mount apparatus comprising:

a work piece table for setting a work through a jig disk and moving the work piece to a predetermined position by displacing the work piece in at least one of X- and Y-axis directions and a rotary direction, the work piece having at least one adhering portion;

a dispenser for applying a photocuring adhesive to a predetermined position of the adhering portion of the work piece;

a core slider container for containing at least one core slider that is to be adhered to the adhering portion of the work piece through the adhesive;

a core slider positioner for vacuum sucking the core slider picked up from the core slider container;

a core mount chuck for moving the core slider picked up from the core slider container in a Z-axis direction by clamping or sucking and mounting the core slider onto the adhering portion of the work piece;

a spot radiating section for radiating UV rays onto the adhesive applied by the dispenser;

work piece posture detecting means for detecting a posture of the work set on the work table; and position correcting means for correcting a positioning error between the adhering portion of the work piece and the core slider based on posture information of the work piece obtained by the work posture detecting means;

the core slider positioner having:

first positioning catches for positioning the core slider picked up from the core slider container by clamping in one of the X-axis direction (and the Y-axis direction;

the core mount chuck having:

second positioning catches for positioning the core slider picked up from the core slider container by clamping in the Y-axis direction (or in the X-axis direction) above the core slider positioner.

A second aspect of the present invention provides a core slider mounting method comprising the steps of:

setting a work on a work piece table through a jig disk;

detecting a posture of the work piece set on the work table;

applying an adhesive to a predetermined position of an adhering portion of the work piece with a dispenser;

sucking a core slider that is to be adhered to the adhering portion of the work piece with a core slider positioner and positioning the core slider by clamping in X- and Y-axis directions with first and second positioning catches;

sucking and moving the core slider with the core slider clamped by the second positioning catches and moving the work piece on the work table below the core slider;

correcting a positioning error between the adhering portion of the work piece and the core slider based on posture information of the work piece obtained in the work posture detecting step; and tentatively curing the adhesive by radiating UV rays onto the core slider by pushing the core slider onto the adhering portion of the work piece through the adhesive.

A third aspect of the present invention provides a core slider mount apparatus comprising:

a work table for setting a work piece through a jig disk and moving the work piece to a predetermined position while displacing the work piece in X- and Y-axis directions and in a rotary direction, the work piece having at least one adhering portion;

a dispenser for applying a photocuring adhesive to a predetermined position of the adhering portion of the work piece;

a core slider container for containing at least one core slider that is to be adhered to the adhering portion of the work piece through the adhesive;

a core slider positioner for vacuum sucking the core slider picked up from the core slider container;

first positioning catches, provided on the core slider positioner, for positioning the core slider picked up from the core slider container by clamping in one of the X-axis direction (and the Y-axis direction;

second positioning catches for positioning the core slider picked up from the core slider container by clamping in the other of the Y-axis direction (and the X-axis direction above the core slider positioner;

a spot radiating section for radiating UV rays onto the adhesive applied by the dispenser;

work/core slider posture detecting means for detecting a posture of the work piece and a posture of the core slider within a single view; and position correcting means for correcting a positioning error between the adhering portion of the work piece and the core slider based on posture information of the work piece and the posture of the core slider obtained by the work piece/core slider posture detecting means;

the second positioning catches functioning as a means for moving the core slider in a Z-axis direction;

A fourth aspect of the present invention provides a core slider mounting method comprising the steps of:

setting a work piece on a work table through a jig disk;

applying an adhesive to a predetermined position of an adhering portion of the work piece with a dispenser;

vacuum sucking a core slider that is to be adhered to the adhering portion of the work piece with a core slider positioner and positioning the core slider by clamping in X- and Y-axis directions with first and second positioning catches;

moving the core slider with the core slider clamped by the second positioning catches and moving the work piece on the work table below this core slider;

detecting a posture of the work piece and a posture of the core slider within a single view;

correcting a positioning error between the adhering portion of the work piece and the core slider based on posture information of the work piece obtained by the work piece posture detecting step; and tentatively curing the adhesive by radiating UV rays onto the core slider by pushing the core slider onto the adhering portion of the work piece through the adhesive.

A fifth aspect of the present invention provides a core slider mount apparatus in which the dispenser applies the adhesive to a predetermined position of the adhering portion of the work piece based on recognized posture information of the work.

A sixth aspect of the present invention provides a core slider mount apparatus comprising:

a work piece table for setting a work piece through a jig disk and moving the work piece to a predetermined position while displacing the work piece in a X- and Y-axis directions and in a rotary direction, the work having at least one adhering portion and having a positioning marker for indicating a position of the adhering portion on a reverse surface thereof;

a dispenser for applying a photocuring adhesive to a predetermined position of the adhering portion of the work piece;

a core slider container for containing at least one core slider that is to be adhered to the adhering portion of the work piece through the adhesive;

a core mount chuck for moving the core slider picked up from the core slider container in a Z-axis direction by clamping or sucking and mounting the core slider on the adhering portion of the work piece;

a spot radiating section for radiating UV rays on the adhesive applied by the dispenser;

core slider posture detecting means for detecting a posture of the core slider clamped or sucked by the core mount chuck;

work piece posture detecting means for detecting a posture of the work piece set on the work table; and position correcting means for correcting a positioning error between the adhering portion of the work piece and the core slider;

the core slider posture detecting means detecting the posture of the core slider clamped or sucked by the core mount chuck from above the core slider, the work piece posture detecting means being located below the work piece set on the work table and detecting a position of the adhering portion of the work piece as the posture of the work piece;

the position correcting means correcting the positioning error between the adhering portion of the work and the core slider based on position information of the adhering portion of the work piece obtained as the work posture information obtained by the work posture detecting means and posture information of the core slider obtained by the core slider posture detecting means immediately before the adhering portion of the work piece is adhered to the core slider by curing the adhesive.

A seventh aspect of the present invention provides a core slider mount apparatus where:

the work piece comprises gimbals constituting a magnetic head of a hard disk drive;

the adhering portion of the work piece is an adhering portion of the gimbals; and a positioning marker is proved on a reverse surface of the gimbals.

An eight aspect of the present invention provides a core slider mount apparatus, wherein the work posture detecting means and the core slider posture detecting means are optical cameras for detecting a position of the adhering portion of the work piece and a posture of the core slider in the form of an image.

A ninth aspect of the present invention provides a core slider mount apparatus, wherein the work posture detecting means and the core slider posture detecting means detect a position of the adhering portion of the work piece and a posture of the core slider using laser sensors.

A tenth aspect of the present invention provides a core slider mount apparatus, wherein:

the work piece comprises gimbals constituting a magnetic head of a hard disk drive;

a pivot is provided at a predetermined position on an obverse surface of the gimbals, and a cantilevered feature plate onto which the core slider is to be adhered is mounted on the pivot; and a positioning marker is provided on a reverse surface of the gimbals at the same position as the pivot, or on the reverse surface of the gimbals at such a position as to allow one to guess where the pivot is located.

An eleventh aspect of the present invention provides a core slider mount apparatus, wherein the positioning marker is a dimple formed at the time when the pivot is machined.

A twelfth aspect of the present invention provides a core slider mounting method comprising the steps of:

setting gimbals on a work table through a jig disk;

applying an adhesive to a predetermined position of a flexure plate of the gimbals based on a position of a pivot of the gimbals obtained by detecting a positioning marker of the gimbals;

mounting a core slider that is to be adhered to the flexure plate of the gimbals by pushing the core slider onto the flexure plate through the adhesive;

detecting a posture of the core slider and detecting a position of the pivot of the gimbals simultaneously;

correcting a positioning error between the core slider and the pivot of the gimbals based on posture information of the core slider and position information of the pivot of the gimbals obtained in the detection step; and curing the adhesive by radiating UV rays onto the adhesive.

Therefore, according to the present invention, a synthetic positioning operation based on image recognition of the adhering portion of the work piece can be performed in addition to mechanical positioning adjustments of the core slider, and thus the core slider mounting accuracy can be improved. This advantage can be obtained by such a construction that not only the core slider is positioned while clamped in the X- and Y-axis directions by the first and second poistioning catches, but also the core slider is mounted after the positioning error between the adhering portion of the work piece and the core slider has been corrected based on the information about the recognized posture of the work piece set on the work piece table. Further, the present invention contributes to improving the core slider mounting accuracy. This advantage can be obtained by such a construction in that the core slider is vacuum sucked by the core mount chuck with the core slider clamped by the second positioning catches, and thus displacement of the core slider caused when the core slider positioner handles the core slider can be avoided.

Still further, the present invention can improve the core slider mounting accuracy significantly. This advantage can be obtained by such construction in that the positioning error between the adhering portion of the work piece and the core slider is corrected based on the posture information about the work piece and the core slider obtained by optically recognizing the posture of the work piece and that of the core slider within a single view.

DETAILED DESCRIPTION OF THE PREFERRED EMBODIMENTS

Figure 1:
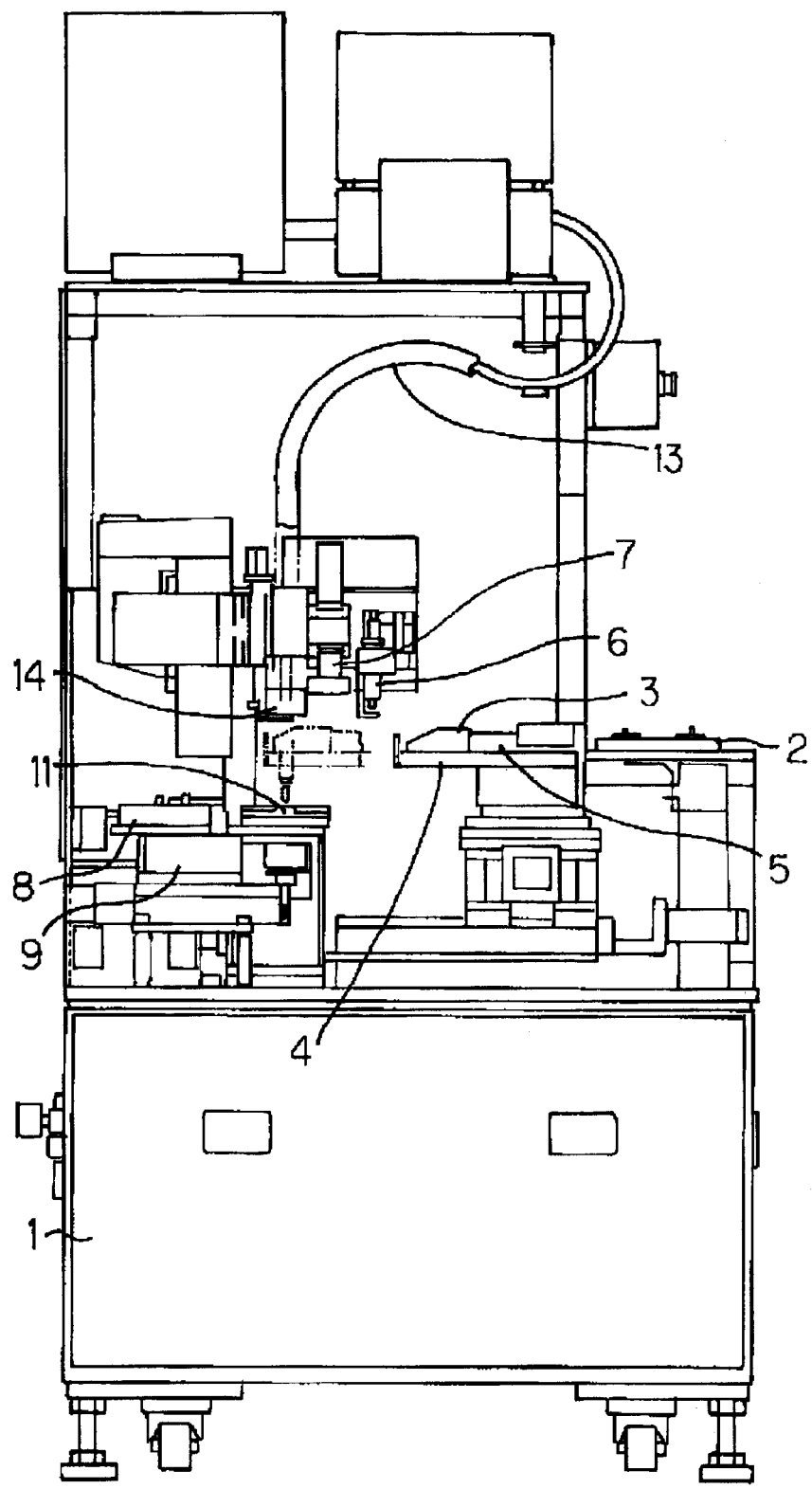
FIG. 1 is a front view of a core slider mount apparatus, which is an embodiment of the present invention.

Embodiments of the present invention will now be described in detail based on the drawings. In the following description, components and parts performing the same function are denoted by the same reference numerals.

Figure 2:
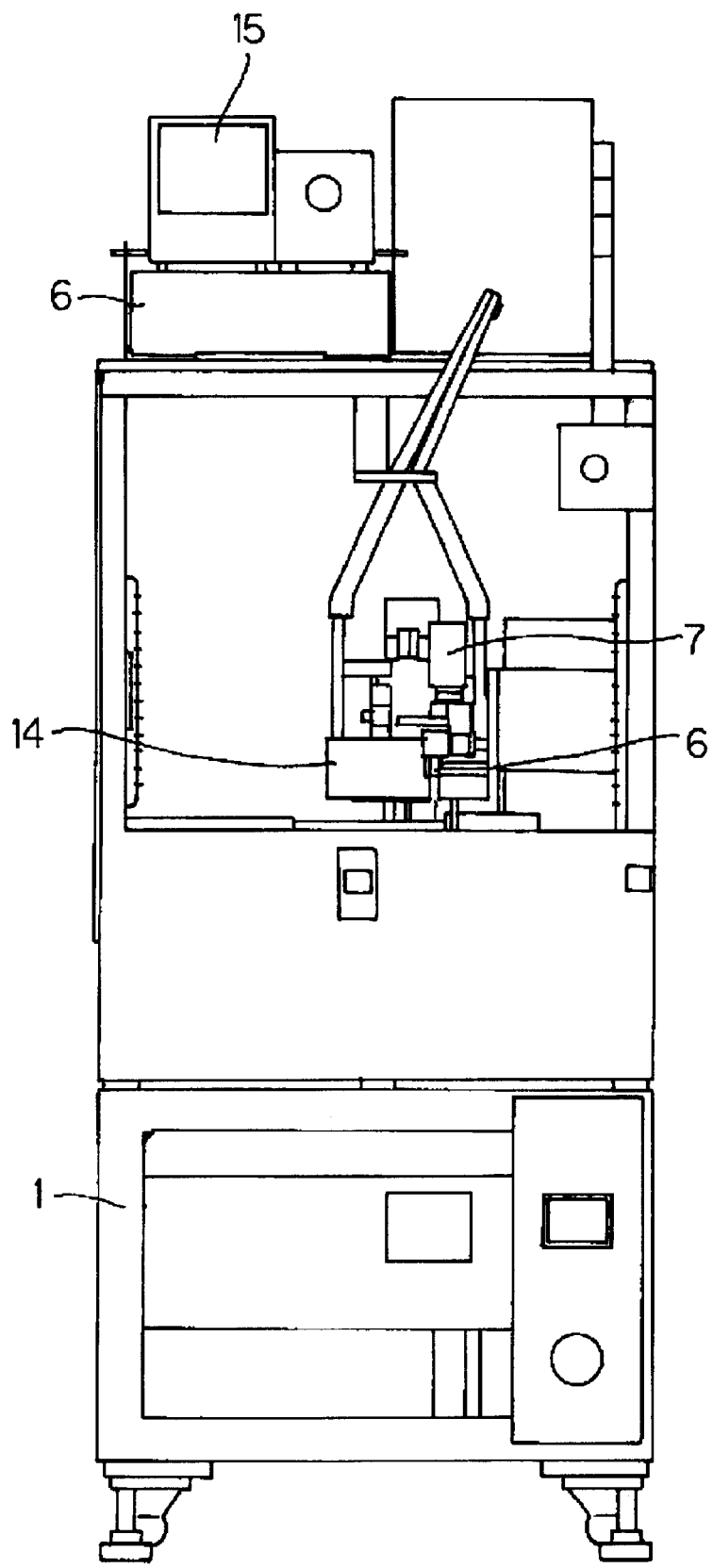
FIG. 2 is a side view of the core slider mount apparatus shown in FIG. 1.
Figure 3:
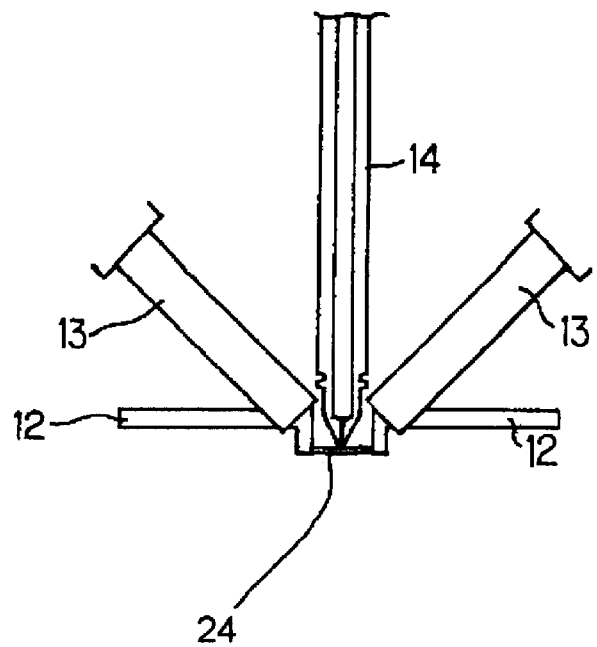
FIG. 3 is a front view of a core mount chuck in the core slider mount apparatus shown in FIG 1.
Figure 4:
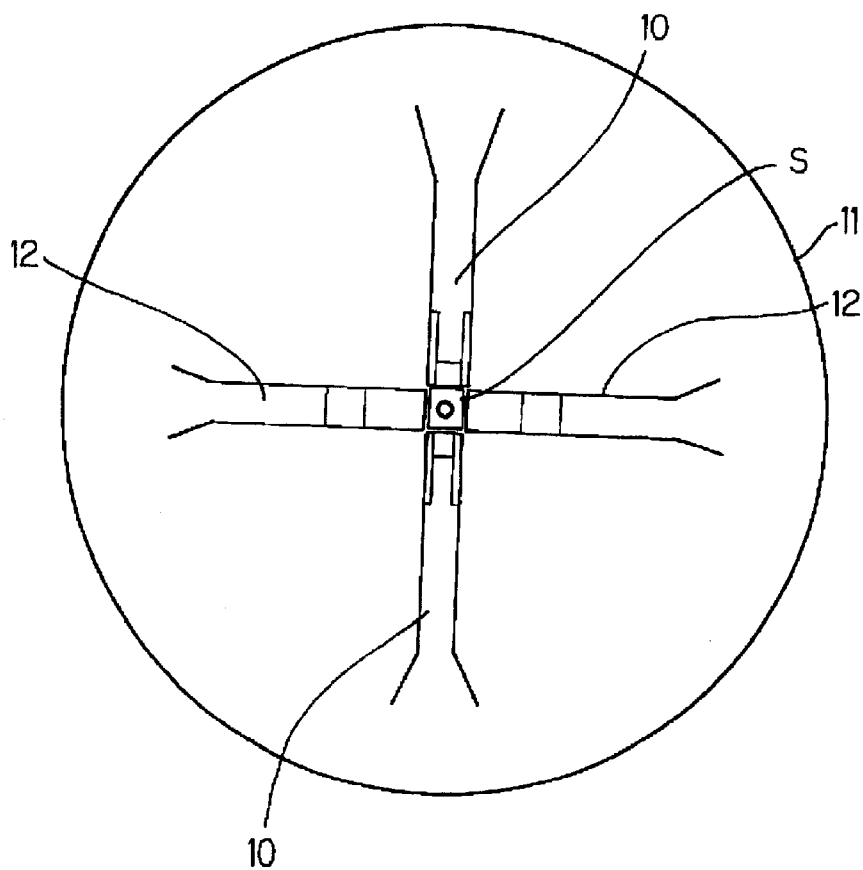
FIG. 4 is a plane view of a core slider positioner in the core slider mount apparatus shown in FIG. 1.

FIG. 1 is a front view of a core slider mount apparatus, which is an embodiment of the present invention; FIG. 2 is a side view of the core slider mount apparatus shown in FIG. 1; FIG. 3 is a front view of a core mount check in the core slider mount apparatus shown in FIG. 1 and FIG. 4 is a plane view of a core slider positioner in the core slider mount apparatus shown in FIG. 1.

The core slider mount apparatus shown in FIG. 1 has a work changing section 2 that is located above a base 1 and on an operator side. The work changing section 2 serves to carry in and out a work piece such as gimbals having at least one adhering portion.

Downstream of the work changing section 2 is a work table 4. The table 4 is used to set the work piece thereon through a jig disk 3 and move the work piece in X- and Y-axis directions as well as in a rotary direction. A work clamper 5 that fixes the work is arranged on the work table 4.

Above the work table 4 are a dispenser 6 and an optical camera 7. The dispenser 6 applies a photocuring adhesive to a predetermined position of the adhering portion of the work. The optical camera 7 optically recognizes the posture position or orientation of the work piece set on the work table 4. That is, the optical camera 7 detects the posture of the work piece set on the work table 4, and thus serves as a means for obtaining posture information of the work piece. When such work posture information has been obtained, the information is then used to correct a positioning error between the adhering portion of the work and a core slider 24 (see FIG. 3). The work piece posture information is also used to cause the dispenser 6 to apply the adhesive to end portions of the adhering portion of the work.

On the opposite side of the work changing section 2 above the base 1 is a core slider container 8 in which a predetermined number of core sliders 24 are neatly arranged. A core table 9 moves the core slider container 8 in the X- and Y-axis directions.

A core slider positioner 11 is a provided near the core slider container 8. The core slider positioner 11 not only sucks each core slider 24 picked up from the core slider container 8, but also has first position or clamping catches 10 that position the core slider 24 by clamping in one of the X-axis direction and the Y-axis direction.

Above the core slider positioner 11 is a core mount chuck 14. The chuck 14 has second positioning or clamping catches 12 and spot radiating sections 13. The second positioning catches 12 position the core slider 24 that has been picked up from the core slider container 8 by clamping in the other one of the Y-axis direction and the X-axis direction above the core slider positioner 11. The spot radiating sections 13 radiate UV rays onto the adhesive applied by the dispenser 6. It may be noted that the core mount chuck 14 not only clamps the core slider 24 with its second positioning catches 12, but also sucks and moves the core slider 24 in a Z-axis direction. Further, there are two spot radiating sections 13 and they are arranged at a predetermined angle apart from each other with respect to the adhering surface. Reference numeral 15 in the FIGURE denotes a monitor.

Next, a core slider mounting method in the thus constructed core slider mounting apparatus will be described.

First, an operator sets a work piece on the jig disk 3. Then, the jig disk 3 having the work piece already set thereon is elevated with a lifter (not shown), so that the disk 3 is mounted on the work table 4.

When the jig disk having the work piece set thereon has been mounted on the work table 4, the work clamper 5 is lowered to fix the work piece to the work table 4. Then, the optical camera 7 optically detects the presence and posture of the work set on the work piece table 4, and the work posture information is obtained at this point of operation.

Then, the dispenser 6 applies the adhesive onto the end portions of the adhering portion of the work piece based on the work posture information. It should be noted that the dispenser 6 gives a waste application of the adhesive before regular applications.

When the dispenser 6 has finished applying the adhesive, the core slider 24 is picked up from the core slider container 8, and the core slider positioner 11 sucks the core slider 24. Then, the first and second positioning catches 10 and 12 are pneumatically driven to position the core slider 24 by clamping in the X- and Y-axis directions.

Then, the core mount chuck 14 sucks and moves upward the core slider 24 with the slider 24 clamped by the second positioning catches 12, while the work on the work piece table 4 is moved below the core slider 24.

Then, positioning error between the adhering portion of the work piece and the core slider 24 is corrected based on the work posture information.

Upon completion of the positioning error correction, the adhesive interposed between the core slider 24 and the work piece is tentatively cured by UV radiation from the spot radiating sections 13, allowing the core slider 24 to be pushed onto the adhering portion of the work piece through the adhesive by the core mount chuck 14. The number of spot radiating sections 13 to be provided and their radiation angles may differ depending on the shape and characteristics of the core slider 24.

Then, the work piece that has been mounted is returned to the work table 4 and carried out from the work changing section 2.

Thus, according to the core slider mount apparatus of this embodiment, not only is the core slider 24 is positioned while clamped in the X- and Y-axis directions by the first and second positioning catches 10 and 12, but also the core slider 24 is mounted after the positioning error between the adhering portion of the work piece and the core slider 24 has been corrected based on the posture information of the work piece set on the work table 4. Therefore, the apparatus of this embodiment can implement a synthetic positioning operation based on image recognition of the adhering portion of the work piece in addition to mechanical positioning adjustments of the core slider 24. Hence, the mounting accuracy of the core slider 24 can be improved.

Further, the core slider mount apparatus according to this embodiment causes the core mount chuck 14 to suck the core slider 24 with the slider 24 clamped by the second positioning catches 12. Therefore, displacement of the core slider 24 to be caused when the core slider positioner 11 handles the core slider 24 can be avoided. Hence, the mounting accuracy of the core slide 24 can be further improved.

As another embodiment, a core slider mount apparatus may dispense with the core mount chuck 14 excluding the spot radiating sections 13 and provide and optical camera 7 ( work/core slider posture detecting means) that recognizes the posture of the work and that of the core slider 24 within a single view. This modification can be made by giving the second positioning catches 12 the function of moving the core slider 24 in the Z-axis direction, in addition to its positioning function.

According to this modified construction, the posture of the work and that of the core slider 24 can be recognized within the single view, and thus a positioning error between the adhering portion of the work and the core slider 24 can be corrected based on both the posture information of the work and that of the core slider 24 obtained by this construction. Therefore, the mounting accuracy of the core slider 24 can be improved significantly. Further, the optical camera 7 can be used also for the inspection of the work as mounted.

Next, another embodiment of the present invention will be described in detail based on FIGS. 5 to 14. In the following description, components and parts performing the same functions are denoted by the same reference numerals.

Figure 5:
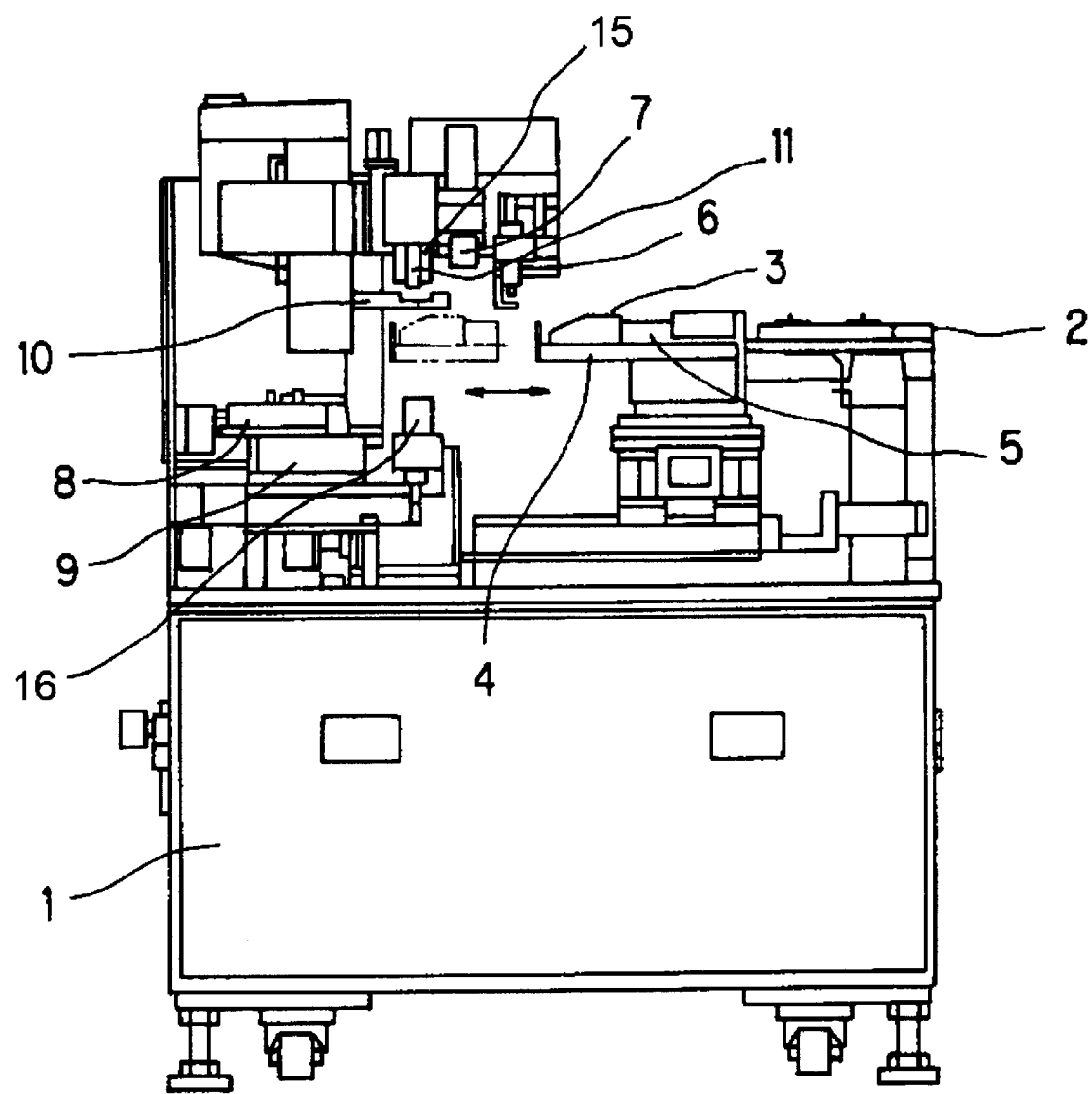
FIG. 5 is a front view of a core slider mount apparatus, which is another embodiment of the present invention.
Figure 6:
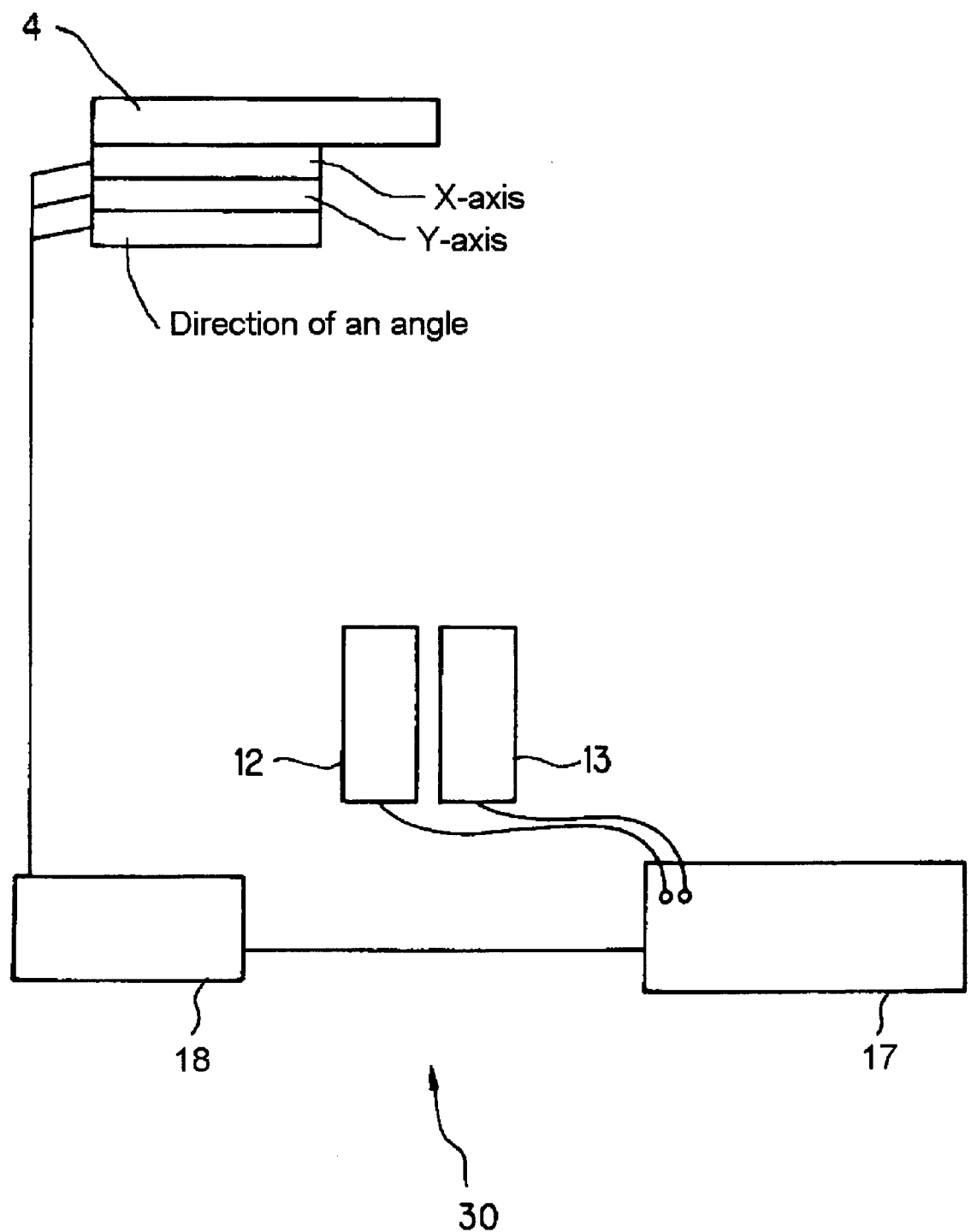
FIG. 6 is a diagram showing a construction of a position correcting section for correcting a positioning error between a core solider and gimbals in the core slider mount apparatus shown in FIG. 5.
Figure 7:
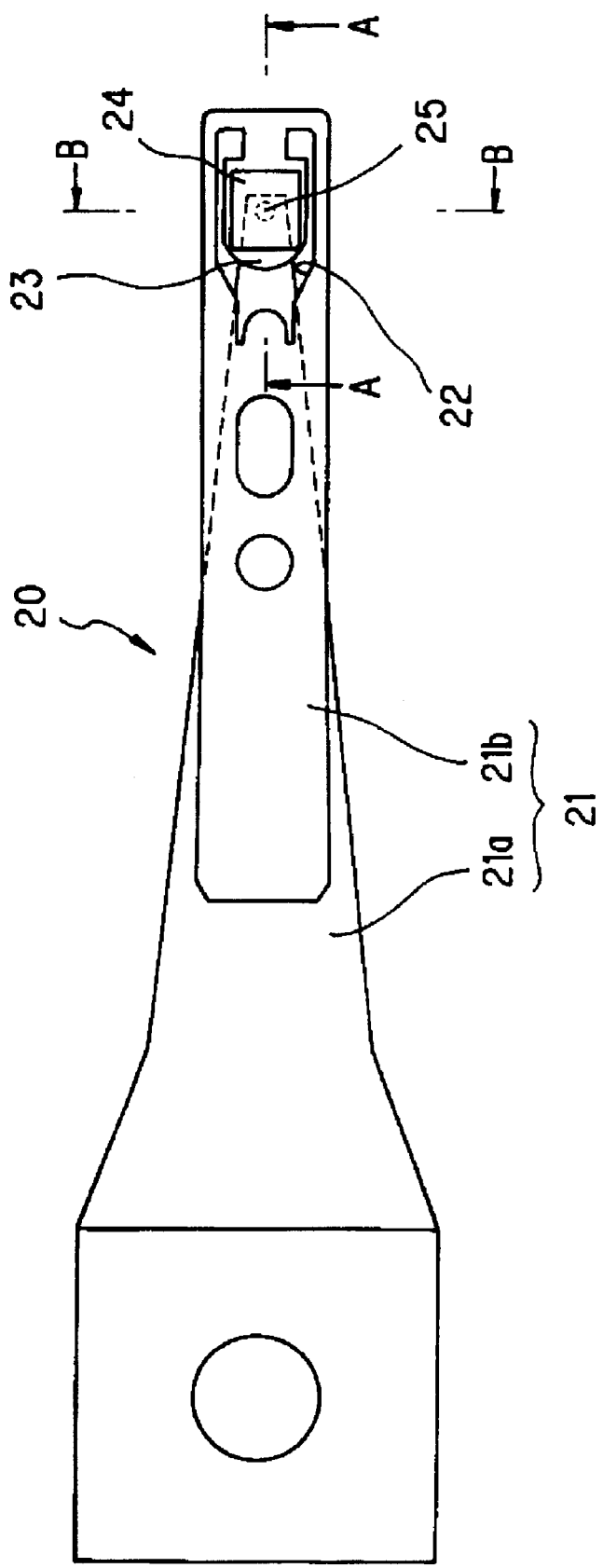
FIG. 7 is a plane view of a magnetic head.
Figure 8:
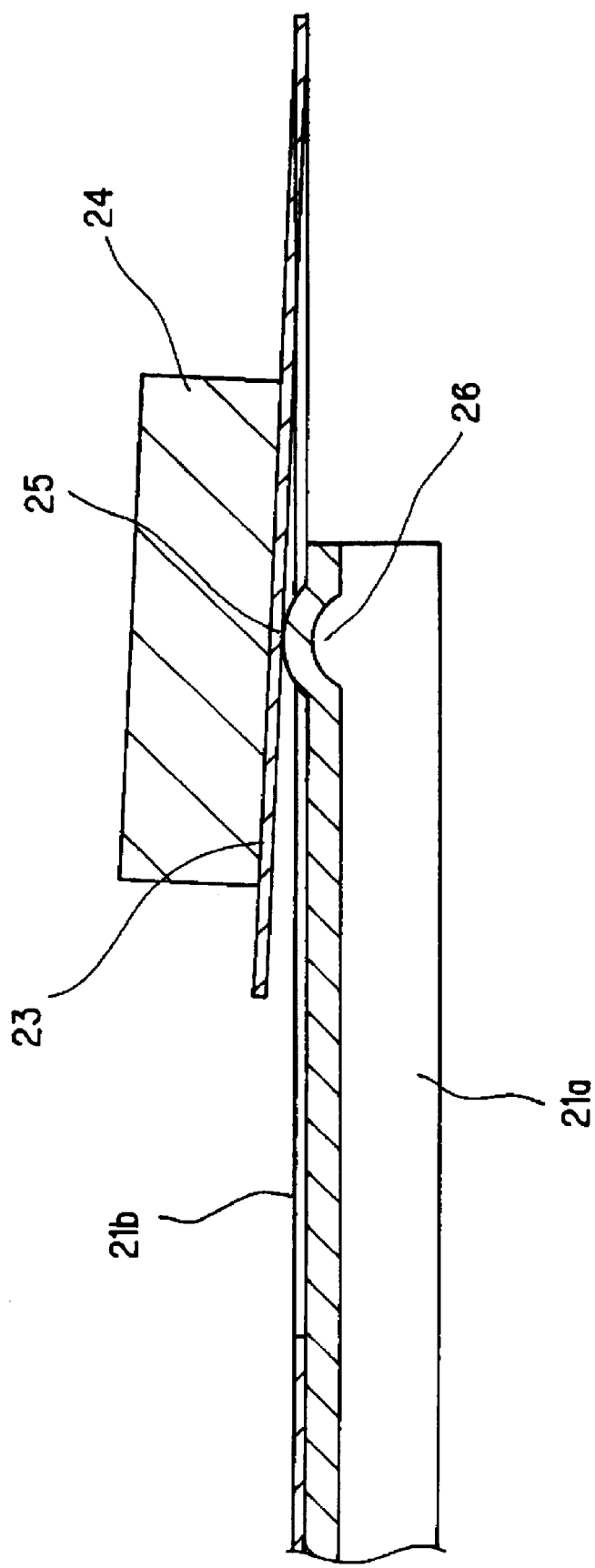
FIG. 8 is a sectional view taken along a line A—A of FIG. 7.
Figure 9:
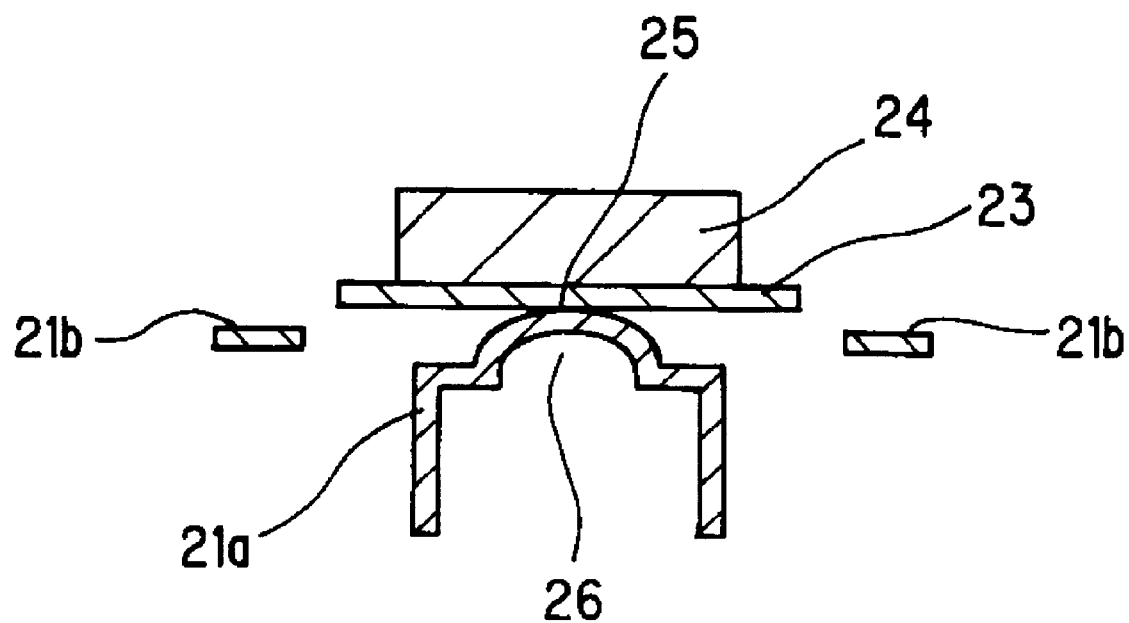
FIG. 9 is a sectional view taken along a line B—B of FIG. 7.
Figure 10:
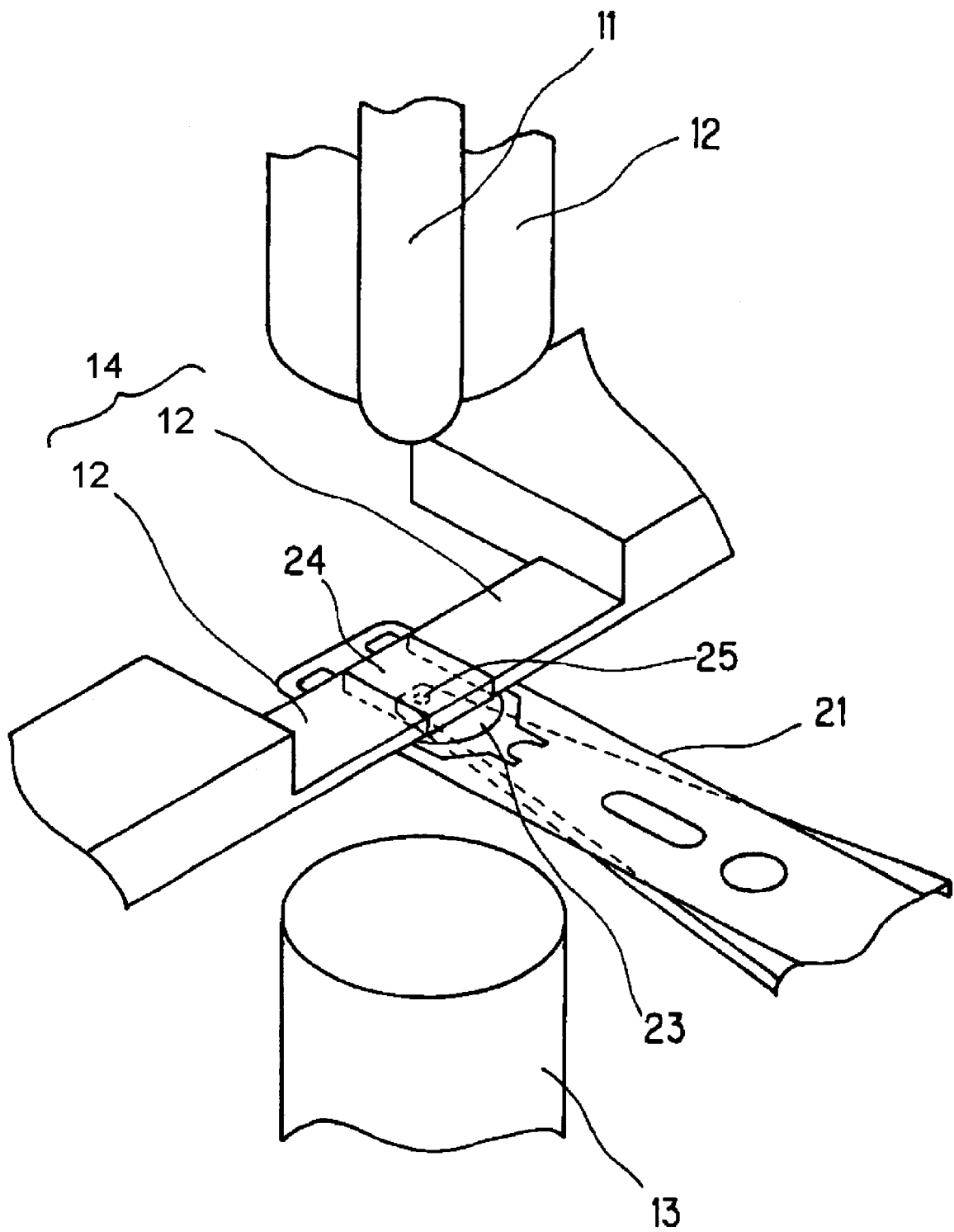
FIG. 10 is a perspective view showing a positioning section between the core slider and the gimbals in the core slider mount apparatus shown in FIG. 5.
Figure 11:
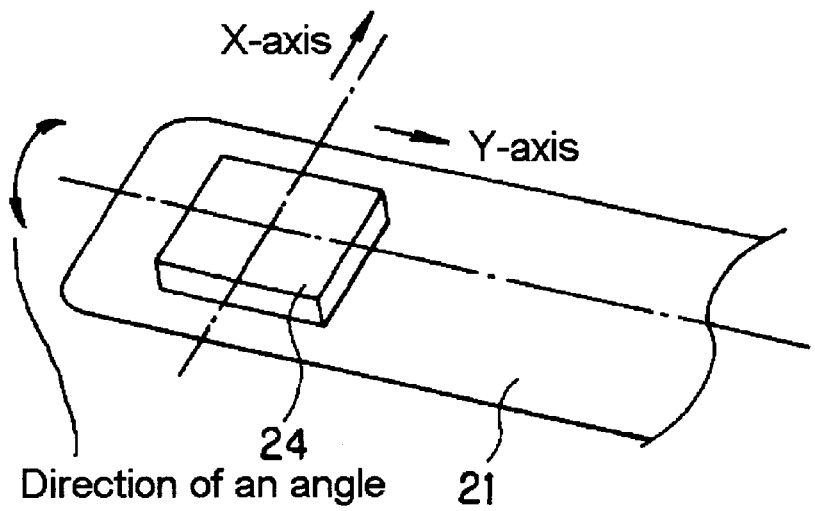
FIG. 11 is a diagram showing X- and Y-axis directions and a direction of an angle of the gimbals in the core slider mount apparatus shown in FIG. 5.
Figure 12:
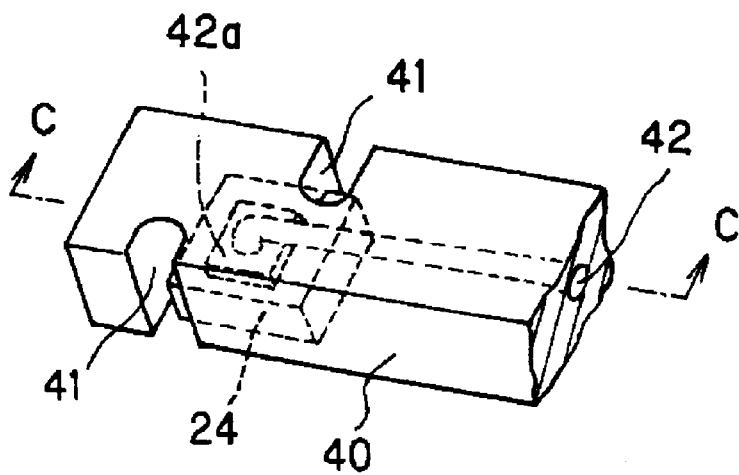
FIG. 12 is a perspective view showing a main portion of a sucking head of the core slider mount apparatus shown in FIG. 5.
Figure 13:
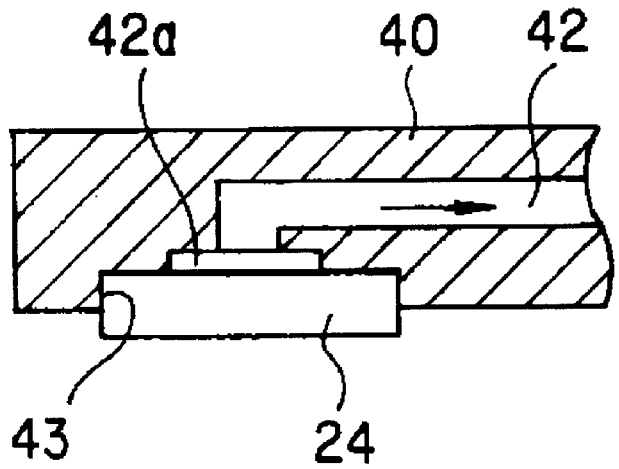
FIG. 13 is a sectional view taken along a line of C—C of FIG. 12.
Figure 14:
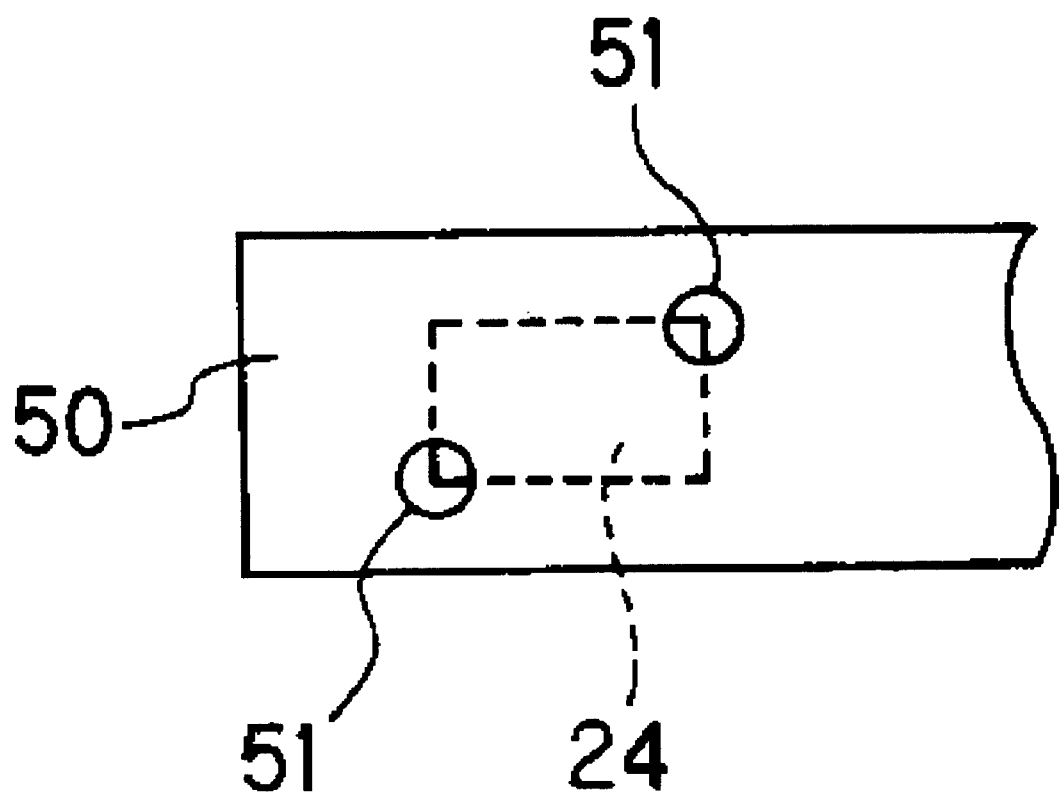
FIG. 14 is a plane view showing a main portion of the sucking head of the core slider mount apparatus shown in FIG. 5.

FIG. 5 is a front view of a core slider mount apparatus, which is another embodiment of the present invention; FIG. 6 is a diagram showing a construction of a position correction section for correcting a positioning error between a core slider and gimbals in the core slider mount apparatus shown in FIG. 5; FIG. 7 is a plane view of a magnetic head; FIG. 8 is a sectional view taken along a line A—A of FIG. 7; FIG. 9 is a sectional view taken along a line of B—B of FIG. 7; FIG 10 is a perspective view showing a positioning section between the core solider an the gimbals in the core slider mount apparatus shown in FIG. 5; FIG. 11 is a diagram showing X- and Y-axis directions and a direction of an angle of the gimbals in the core slider mount apparatus shown in FIG. 5; FIG. 12 is a perspective view showing a main portion of a sucking head of the core slider mount apparatus shown in FIG. 5; FIG. 13 is a sectional view taken along a line of C—C of FIG. 12; and FIG. 14 is a plane view showing a main portion of the sucking head of the core slider mount apparatus shown in FIG. 5.

As shown in FIGS. 7 to 9, a work is gimbals 21 that constitute a magnetic head 20. The gimbals 21 are arranged such that the major part of a frame 21b is welded over a load beam 21a, and the distal end of the from 21b has a C-shaped notch 22. In the middle of the notch 22 is a cantilevered flexure plate 23. The core slider 24 is supposed to be adhered onto the flexure plate 23

Further, a pivot 25 is formed on the distal end of the load beam 21a. The flexure plate 23 is put on the pivot 25. A dimple 26 that serves as a positioning marker is formed at the same position as the pivot 25 on the reverse surface of the load beam 21a at the same time the pivot 25 is machined. Any positioning marker can be used in place of the dimple 26 as long as it allows one to guess where the pivot 25 is located.

By the way, the magnetic head 20 has such a structure that the pivot 25 is provided on the reverse surface of the flexure plate 23 as described above, and thus yields to bending so that the head 20 extends in parallel with a disk surface around the pivot 25. The pivot 25 serves as a reference for obtaining the positioning accuracy of the core slider 24. However, the pivot 25 of this type is concealed by the flexure plate 23, and this structure imposes the problem that the parts machining accuracy affects the positioning accuracy when the center of the pivot 25 is guessed based on features of the gimbals 21 such as its external shape. It should be emphasized here that highly improved performance of the magnetic head 20 these days calls for high accuracy in guessing the pivot position. Further, when the core slider 25 is positioned with respect to the gimbals 21, the posture of the gimbals 21 cannot be recognized, and from this arises another problem in that the positioning accuracy is affected by displacements caused when the core slider 24 is pushed onto the gimbals 21 and by mechanical errors caused when an actuator is moved. In view of such problems, the core slider mount apparatus shown in FIG. 5 was developed for the magnetic head 20 in which the pivot 25 is disposed on the reverse surface of the flexure plate 23. That is, the apparatus shown in FIG. 5 was developed so that the core slider 24 can be mounted with high accuracy. The core slider mount apparatus shown in FIG. 5 and a core slider mount method using such apparatus will be described below.

A basic construction of the core slider mount apparatus shown in FIG. 5 is similar to the core slider mount apparatus according to the aforementioned embodiment in the following point:

(1) A work changing section 2 is provided above a base 1 of the core slider mount apparatus on an operator side. The work changing section 2 serves to carry in and out a work that has at least one adhering portion;

(2) Downstream of the work changing section 2 is a work table 4, which allows the work to be set thereon through a jig disk 3 and moves the work in X- and Y-axis directions as well as in a direction of an angle (rotary direction). A work clamper 5 that fixes the work is provided on the work table 4;

(3) Above the work table 4 are a dispenser 6 and an optical camera 7. The dispenser 6 applies a photocuring adhesive to a predetermined position of the adhering portion of the work; and the optical camera 7 optically detects the posture of the work sest on the work table 4. The dispenser 6 applies the adhesive based on posture information of the work obtained by the optical camera 7;

(4) On the opposite side of the work changing section 2 above the base 1 is a core slider container 8 in which a predetermined number of core slides 24 are neatly arranged. A core table 9 moves the core slider container 8 in the X- and Y-axis directions;

(5) Near the core slider container 8 is a core mount chuck 14, which picks up the core slider 24 in the core slider container 8 by clamping in a horizontal direction using pneumatically driven second positioning catches 12 and moves the core slider 24.

In the core slider mount apparatus shown in FIG. 5, an upper CCD camera 15, which is a know type of an optical camera, is provided above the core mount chuck 14. The camera 15 serves as a means for detecting the posture of the core slider clamped or sucked by the core mount chuck 14. On the other hand, below the core mount chuck 14 is a lower CCD camera 16, which a similar type of an optical camera provided as a means for detecting the posture of the gimbals 21 set on the work table 4. The lower CCD camera 16 confronts the upper CCD camera 15.

The upper CCD camera 15 serving as the core slider posture detecting means detects the core slider 24 from above the core slider 24 clamped or sucked by the core mount chuck 14. Further, the lower CCD camera 16 serving as the work posture detecting means is located below the gimbals 21 set on the work table 4, and detects the position of the adhering portion of the gimbals 21 s the posture of the gimbals 21 from the positioning marker 25 of the gimbals 21.

Near the upper CCD camera 15 is a spot radiating section 13 that radiates UV rays onto the adhesive applied by the dispenser 6.

As shown in FIG. 6, a position correcting means 30 is connected to the work table 4. The means 30 corrects a positioning error between the adhering portion of the gimbals 21 and the core slider 24.

The position correcting means 30 has a correction control section 17, which is connected to a motor driving section 18. The section 18 drives the upper CCD camera 15, the lower CCD camera 16 and the work table 4.

The correction control section 17 corrects a positioning error between the adhering portion of the gimbals 21 and the core slider 24 based on position information of the adhering portion of the gimbals 21 obtained as posture information of the gimbals 21 by the lower CCD camera 16 and posture information of the core slider 24 obtained by the upper camera 15. That is, the correction control section 17, upon reception of the position information of the adhering portion of the gimbals 21 and the posture information of the core slider 24, calculates distances for correcting the position of the adhering portion of the core slider 24 and that of the adhering portion of the gimbals 21, and the drive section 18 drives the work table 4 in response to a correction instruction from the correction control section 17. Thus, the positioning error between the adhering portion of the gimbals 21 and the core slider 24 is corrected by moving the work table 4. It may be noted that the correction is made immediately before the gimbals 21 is adhered to the core slider 24 by curing the adhesive.

Next, a core slider mount method in the thus constructed core slider mount apparatus will be described (see FIG. 10).

First, the operator sets the gimbals 21 on the jug disk 3. Then, the jig disk 3 on which the work has been set is elevated by a lifter (not shown), so that the jig 3 is mounted on the work table 4.

Then, the work clamper 5 is lowered to fix the gimbals 21 to the work table 4. Thereafter, the optical camera 7 optically detects the presence and posture of the gimbals 21 set on the work table 4, and as a result, the work posture information about the gimbals 21 is obtained. The work posture information may be obtained by calculating a displacement of the dimple 26 of the gimbals 21 from a reference position using the lower CCD camera 16.

Then, the dispenser 6 applies the adhesive. That is, the dispenser 6 applies the adhesive onto the flexure plate 23, which is the adhering portion of the gimbals 21, based on the work posture information. It should be noted that the dispenser 6 gives a waste application of the adhesive before regular applications.

When the dispenser 6 has completed its application of the adhesive, a slider chuck 10 picks up the core slider 24 from the core slider container 8, and pushes the core slider 24 onto the flexure plate 23 of the gimbals 21 set on the work table 4 through the adhesive to mount the slider 24 on the plate 23.

Successively, the upper CCD camera 15 detects the posture of the core slider 24, and the lower CCD camera 16 detects the posture of the gimbals 21 simultaneously. This time, the posture of the core slider 24 is detected by the upper CCD camera 15 as the information about the posture of the core slider 24 based on a displacement of the core slider 24 clamped by the slider chuck 10 from the reference position. The posture of the gimbals 21 is detected by the lower CCD camera 16 as the position information of the flexure plate 23 with respect to the pivot 25 as a reference based on a displacement of the dimple 26 from the reference position.

Then, immediately before the core slider 24 is adhered to the flexure plate 23 by curing the adhesive applied by the dispenser 6, the correction control section 17 corrects a positioning error between the adhering portion of the gimbals 21 and the core slider 24 based on posture information of the core slider 24 and position information of the flexure plate 23 (posture information of the gimbals 21).

That is, the correction control section 17 calculates a position correcting amount based on posture information of the core slider 24 and position information of the flexure plate 23, gives a correction instruction to the motor drive section 18 to drive the work table 4, and moves the gimbals 21 set on the work table 4 in the X- and Y-axis directions and in the direction of angle (see FIG. 11). As a result, the positioning error between the core slider 24 and the flexure plate 23 is corrected, and thus the slider 24 can be positioned with respect to the plate 23 with high accuracy.

Upon completion of such positioning error correction, the spot radiating section 13 radiates UV rays to cure the adhesive interposed between the core slider 24 and the adhering portion of the work. The number of spot radiating sections 13 to be provided and their radiation angles may differ depending on the shape and characteristics of the core slider 24.

The core mount chuck 14 thereafter unchucks the core slider 24. The gimbals 21 on which the core slider 24 has been mounted is returned onto the work table 4 and carried out from the work changing section 2.

As described above, according to the core slider mount apparatus of this embodiment, a synthetic positioning operation can be performed by recognizing the core slider 24 and the flexure plate 23 with respect to the pivot 25 image-wise based on the displacement between the core slider 24 and the dimple 26 that is found when the core slider 24 is mounted on the flexure plate 23. Further, after the positioning error between the core slider 24 and the flexure plate 23 has been corrected, the adhesive is cured to mount the core slider 24 on the plate 23. Therefore, there are less error-causing factors in the carrying mechanical system, and thus the mounting accuracy of the core slider 24 can be improved.

The core slider mount apparatus according to this embodiment allows the position of the core slider 24 and that of the dimple 26 to be recognized individually. Therefore, the reference positions required for the proper function of the product coincide with the points of position recognition of the parts. Hence, the core slider mount apparatus according to this embodiment does not affect the manufacturing accuracy of the product.

Further, the core slider mount apparatus according to this embodiment also allows the core slider 24 and the dimple 26 to be recognized image-wise individually by the upper and lower CCD cameras 15 and 16, respectively. Therefore, the optical system can be designed individually for the core slider 24 and the dimple 26. Hence, satisfactory image recognition conditions can be obtained with ease.

Still further, the core slider mount apparatus according to this embodiment also allows the upper and lower CCD cameras 15 and 16 to be arranged so that they confront each other. Therefore, each image can be calibrated with reference to a single object. Hence, thus relative accuracy between images can be ensured with ease.

A core slider mount apparatus according to another embodiment may use laser sensors in place of the upper and lower CCD cameras 15 and 16 to detect the position of the core slider 24 and that of the gimbals 21.

Further, while the photocuring adhesive is used for mounting the core slider 24 in the aforementioned embodiments, a thermosetting adhesive may also be used, an adhesive is cured with heating means.

According to this embodiment, while the core mount chuck 14 having second positioning catches 12 as a pair of catches is used to clamp and move the core slider 24 in a horizontal direction, a core mount chuck 40, such as shown in FIGS. 12 and 13, may also be used to vacuum-chuck and move the core slider 24.

A recess 43 for inserting the core slider 24 is formed on a reverse surface toward the distal end of the core mount chuck 40. The shape of the recess 43 is the same as the external shape of the core slider 24. A pair of notches 41 is arranged at different positions on both sides across the width of the chuck 40 so that diagonal angles of the core slider 24 are exposed when the slider 24 is inserted into the recess 43. As a result of this arrangement, the upper CCD camera 15 can detect the posture of the core slider 24 without fail when the slider 24 is vacuum-sucked.

A vacuum path 42 is formed inside the core mount chuck 40 so that the path 42 extends along the length of the chuck 40. A sucking section 42*a* on the distal end of the vacuum path 42 is opened onto the recess 43, so that the sucking section 42*a* can suck the core slider 24.

A core mount chuck 50 shown in FIG. 14 is designed to move the core slider 24 by sucking the slider 24 similarly to the slider chuck 40. A pair of through holes 51 is formed so that diagonal angles of the core slider 24 are exposed when the slider 24 is sucked, and as a result of this arrangement, the upper CCD camera 15 can detect the posture of the core slider 24 without fail.

Further, the core slider mount apparatus according to this embodiment may also be modified in the following way. A core slider positioner having first positioning catches (not shown) may be provided to position the core slider 24 by clamping in the X-axis direction (or Y-axis direction). According to this modification, after the core mount chuck 10, 40 or 50 has picked up the core slider 24 from the core slider container 8, the core slider positioner sucks the core slider 24 to position the slider 24 by clamping in the X-axis direction (or Y-axis direction) with its first positioning catches, and then the slider chuck 10, 40 or 50 moves the core slider 24 to the mounting position.

In the first to fifth aspects of the present invention, not only the core slider is positioned while clamped in the X- and Y-axis directions by the first and second positioning catches, but also the core slider is mounted after the positioning error between the adhering portion of the work and the core slider has been corrected based on the posture information of the work set on the work table. Therefore, a synthetic positioning operation based on image recognition of the adhering portion of the work can be performed in addition to mechanical position adjustments of the core slider. Hence, accuracy of mounting the core slider can be improved.

The first and second aspects of the present invention in particular allow the core slider to be sucked by the core mount chuck with the slider clamped by the second positioning catches. Therefore, displacement of the core slider to be caused when the core slider positioner hands over the core slider can be avoided, which thus contributes to improving mounting accuracy of the core slider.

In the third and fourth aspects of the present invention, the positioning error between the adhering portion of the work and the core slider is corrected based on the posture information about the work and the core slider obtained by optically recognizing the posture of the work and that of the core slider within a single view. Therefore, mounting accuracy of the core slider can be improved significantly.

Further, the present invention allows the work to be automatically supplied. Therefore, the operator has to set the work to the supplying means only at the outset, and thus unmanned operation and safety can be ensured for the subsequent processing steps. Further, even unskilled operators can handle the apparatus, and thus variations in the mounting accuracy due to operators' skill can be eliminated.

Still further, in the present invention, the components of the apparatus are arranged vertically, so that a plurality of processing steps can be performed in parallel. Therefore, not only the equipment can be downsized and made compact, but also the cycle time can be improved. Hence, productivity can be further improved.

In the sixth to twelfth aspects of the present invention, the positioning error between the core slider and the adhering portion of the work is corrected based on the posture information of the core slider as mounted on the adhering portion of the work and the position information of the adhering portion of the work obtained by the positioning marker, and then the core slider is mounted by curing the adhesive. Therefore, the number of factors causing moving system errors can be reduced. Hence, mounting accuracy of the core slider can be improved.

Further, the sixth to twelfth aspects of he invention allow the position of the core slider and that of the positioning marker to be recognized individually. Therefore, the reference positions required for the proper function of the product coincide with the points of position recognition of the parts, which thus does not affect the manufacturing accuracy of the product.

The ninth aspect of the invention, in particular, allows the core slider and the positioning marker to be recognized individually image-wise or with the laser sensors. Therefore, the optical system can be designed individually for the core slider and the positioning marker. Hence, satisfactory image recognition conditions can be obtained.

What is claimed is:

1. A core slider mounting method comprising the steps of:
   setting gimbals on a jig mounted on a work table;
   applying an adhesive to a predetermined position of a flexure plate of the gimbals based on a position of a pivot of the gimbals obtained by detecting a positioning marker formed on the gimbals;
   picking up a core slider that is to be adhered to the flexure plate of the gimbals with a core slider positioner, the core slider positioner having a first clamping catch which clamps in a first direction and a second clamping catch which clamps in a second direction different from the first direction, and positioning the core slider by clamping with the first and second catches;
   moving the core slider with the core slider being clamped by one of the first and second catches, and moving the work table so that the workpiece is positioned below the core slider;
   mounting the core slider by pushing he core slider onto the flexure plate through the adhesive;
   detecting a posture of the core slider and simultaneously detecting a position of the pivot of the gimbals;
   correcting a positioning error between the core slider and the pivot of the gimbals based on posture information of the core slider and position information of the pivot of the gimbals obtained during the posture detection step immediately before the core slider is adhered to the flexure plate by curing the adhesive; and
   curing the adhesive by radiating UV rays onto the adhesive.

2. A core slider mounting method comprising the steps of:
   setting gimbals on a work table of a core slider mount apparatus through a jig disk;
   applying an adhesive to a predetermined position of an adhering portion of the gimbals with a dispenser;
   picking up a core slider that is to be adhered to the adhering portion of the gimbals with a core slider positioner, the core slider positioner having a first clamping catch which clamps in a first direction and a second clamping catch which clamps in a second direction different from the first direction;
   moving the core slider with the core slider being clamped by one of the first and second catches and moving the gimbals to a position below the core slider;
   detecting a posture of the gimbals and the core slider set on the work table and producing a superposed image of the gimbals and core slider;
   correcting a positioning error between the adhering portion of the gimbals and the core slider based on posture information of the gimbals obtained during the posture detecting step; and
   curing the adhesive by radiating UV rays to mount the core slider to the adhering portion of the gimbals through the adhesive.

3. A core slider mounting method according to claim 2; wherein the posture detecting step is performed using two cameras.

4. A core slider mounting method according to claim 2; wherein a pivot is provided at a predetermined position on an obverse surface of the gimbals, and a cantilevered flexure plate onto which the core slider is to be adhered is mounted on the pivot, and a positioning marker is provided on a reverse surface of the gimbals at one of the same position as the pivot and a reverse surface of the gimbals at such a position as to facilitate detection of where the pivot is located.

5. A core slider mounting method according to claim 4; wherein the positioning marker is a dimple formed when the pivot is machined.

6. A core slider mounting method comprising the steps of:
   providing a core slider mount apparatus having a work table;
   providing a jig on the work table;
   placing a workpiece in the jig;

detecting a posture of the workpiece placed in the jig with workpiece posture detecting means;

applying an adhesive to an adhering portion of the workpiece with a dispenser;

picking up a core slider with a core slider positioner, the core slider positioner having a first clamping catch which clamps in a first direction and a second clamping catch which clamps in a second direction different from the first direction, and positioning the core slider by clamping with the first and second catches;

moving the core slider with the core slider being clamped by one of the catches and moving the work table so that the workpiece is positioned below the core slider;

correcting a positioning error between the adhering portion of the workpiece and the core slider based on posture information of the workpiece obtained during the workpiece posture detecting step; and moving the core slider onto the adhering portion of the workpiece and tentatively curing the adhesive by radiating UV rays onto the adhesive.

7. A core slider mounting method according to claim 2; wherein the core slider mount apparatus comprises the work table, wherein the work table is capable of moving in at least one of a first linear direction, a second linear direction different from the first linear direction, and a rotary direction;

the dispenser for applying the adhesive to the adhering portion of the workpiece;

a core slider container for containing at least one core slider that is to be adhered to the adhering portion of the workpiece through the adhesive from which a respective core slider is picked up in the picking up step;

the core slider positioner;

Z-axis moving means for moving the core slider positioner in a Z-axis direction;

a spot radiating section for radiating UV rays onto the adhesive applied by the dispenser in the tentative curing step;

the workpiece posture detecting means for detecting a posture of the workpiece set on the work table in the workpiece posture detecting step; and positioning correcting means for correcting a positioning error between the adhering portion of the workpiece and the core slider in the correcting step based on posture information of the workpiece obtained by the workpiece posture detecting means.

8. A core slider mount apparatus according to claim 7; wherein the dispenser applies the adhesive to the adhering portion of the workpiece based on recognized posture information of the workpiece.

9. A core slider mounting method according to claim 6; wherein the workpiece has a positioning marker for indicating a position of the adhering portion on a reverse surface thereof; and wherein the core slider mount apparatus comprises the work table, wherein the work table is capable of moving in at least a first linear direction, a second linear direction different from the first direction, and a rotary direction;

the dispenser for applying the adhesive to the adhering portion of the workpiece;

a core slider container for containing at least one core slider that is to be adhered to the adhering portion of the workpiece through the adhesive from which a respective core slider is picked up in the picking up step;

the core slider positioner;

Z-axis moving means for moving the core slider positioner in a Z-axis direction;

a spot radiating section for radiating UV rays onto the adhesive applied by the dispenser in the tentative curing step;

core slider posture detecting means for detecting a posture of the core slider in the posture detecting step;

workpiece posture detecting means for detecting a posture of the workpiece set on the work table in the posture detecting step; and position correcting means for correcting a positioning error between the adhering portion of the workpiece and the core slider;

wherein the core slider posture detecting means includes means for detecting the posture of the core slider held by the core slider positioner from above the core slider, and the workpiece posture detecting means is located below the workpiece set on the work table and includes means for detecting a position of the adhering portion of the workpiece as the posture of the workpiece; and wherein the position correcting means includes means for correcting the positioning error between the adhering portion of the workpiece and the core slider based on position information of the adhering portion of the workpiece obtained as the workpiece posture information by the workpiece posture detecting means and posture information of the core slider obtained by the core slider posture detecting means immediately before the adhering portion of the workpiece is adhered to the core slider by tentatively curing the adhesive.

10. A core slider mounting method according to claim 9; wherein:

the workpiece comprises gimbals of a hard disk drive;

the adhering portion of the workpiece is an adhering portion of the gimbals; and a positioning marker is provided on a reverse surface of the gimbals.

11. A core slider mounting method according to claim 9 wherein the workpiece posture detecting means and the core slider posture detecting means are optical cameras for detecting a position of the adhering portion of the workpiece and a posture of the core slider in the form of an image.

12. A core slider mounting method according to claim 9 wherein the workpiece posture detecting means and the core slider posture detecting means detect a position of the adhering position of the workpiece and a posture of the core slider using laser sensors.

13. A core slider mounting method according to claim 9; wherein the workpiece comprises gimbals of a hard disk drive, a pivot is provided at a predetermined position on an obverse surface of the gimbals, and a cantilevered flexure plate onto which the core slider is to be adhered is mounted on the pivot, and a positioning marker is provided on a reverse surface of the gimbals at one of the same position as the pivot and a reverse surface of the gimbals at such a position as to facilitate detection of where the pivot is located.

14. A core slider mounting method according to claim 13; wherein the positioning marker is a dimple formed at the time the pivot is machined.

15. A core slider mounting method comprising the steps of:

providing a core slider mount apparatus having a work table;

providing a jig on the work table;

placing a workpiece in the jig;

applying an adhesive to an adhering portion of the workpiece with a dispenser;

picking up a core slider with a core slider positioner, the core slider positioner having a first clamping catch which clamps in a first direction and a second clamping catch which clamps in a second direction different from the first direction, and positioning the core slider by clamping with the first and second catches;

moving the core slider, clamped by one of the first and second catches, and moving the work table so that the workpiece is positioned below the core slider;

detecting a posture of the workpiece placed in the jig and the core slider with workpiece/core slider posture detecting means to provide a superposed view of the workpiece and the core slider;

correcting a positioning error between the adhering portion of the workpiece and the core slider based on posture information of the workpiece obtained during the workpiece posture detecting step; and mounting the core slider onto the adhering portion of the workpiece and tentatively curing the adhesive by radiating UV rays onto the adhesive.

16. A core slider mounting method according to claim 4; wherein the core slider mount apparatus comprises the work table, wherein the work table is capable moving in at least a first linear direction, a second linear direction different from the first linear direction, and a rotary direction;

the dispenser for applying the adhesive to the adhering portion of the workpiece;

a core slider container for containing at least one core slider that is to be adhered to the adhering portion of the workpiece through the adhesive from which a respective core slider is picked up in the picking up step;

the core slider positioner;

Z-axis moving means for moving the core slider positioner in a Z-axis direction;

a spot radiating section for radiating UV rays onto the adhesive applied by the dispenser in the tentative curing step;

the workpiece/core slider posture detecting means for detecting a posture of the workpiece and a posture of the core slider to provide a superposed view of the workpiece and the core slider; and position correcting means for correcting a positioning error between the adhering portion of the workpiece and the core slider in the correcting step based on posture information of the workpiece and the posture of the core slider obtained by the workpiece/core slider posture detecting means;

wherein the Z-axis moving means comprises the second positioning catches.

* * * * *